US010348180B2

(12) United States Patent
Bhowmik et al.

(10) Patent No.: US 10,348,180 B2
(45) Date of Patent: Jul. 9, 2019

(54) CONVERTER WITH PHASE-OFFSET SWITCHING

(71) Applicants: Shibashis Bhowmik, Charlotte, NC (US); Babak Parkhideh, Charlotte, NC (US)

(72) Inventors: Shibashis Bhowmik, Charlotte, NC (US); Babak Parkhideh, Charlotte, NC (US)

(73) Assignees: SINEWATTS, INC., Charlotte, NC (US); THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 69 days.

(21) Appl. No.: 15/525,686

(22) PCT Filed: Nov. 17, 2015

(86) PCT No.: PCT/US2015/061115
§ 371 (c)(1),
(2) Date: May 10, 2017

(87) PCT Pub. No.: WO2016/081473
PCT Pub. Date: May 26, 2016

(65) Prior Publication Data
US 2017/0366079 A1    Dec. 21, 2017

Related U.S. Application Data

(60) Provisional application No. 62/080,492, filed on Nov. 17, 2014.

(51) Int. Cl.
*H02M 1/08* (2006.01)
*H02J 3/46* (2006.01)
(Continued)

(52) U.S. Cl.
CPC ............... *H02M 1/08* (2013.01); *H02J 3/46* (2013.01); *H02M 3/158* (2013.01); *H02M 7/49* (2013.01); *H02M 2003/1586* (2013.01)

(58) Field of Classification Search
CPC ............ H02M 1/08; H02M 1/14; H02M 7/49; H02M 7/42; H02M 7/53; H02M 7/5387;
(Continued)

(56) References Cited

U.S. PATENT DOCUMENTS

| 8,014,181 B2 * | 9/2011 | Tan | ............ H02M 7/48 327/156 |
| 9,293,921 B2 * | 3/2016 | Jones | ............ H02J 3/01 |

(Continued)

FOREIGN PATENT DOCUMENTS

| EP | 2302783 B1 * | 7/2016 | ............ H02M 7/48 |
| WO | WO 2014192014 A2 * | 12/2014 | ............ H02M 7/4807 |
| WO | WO-2014192014 A2 * | 12/2014 | ............ H02M 4/4807 |

OTHER PUBLICATIONS

International Search Report for International Application No. PCT/US2015/061115, dated Feb. 3, 2016.
(Continued)

*Primary Examiner* — Fritz M Fleming
*Assistant Examiner* — Jagdeep S Dhillon
(74) *Attorney, Agent, or Firm* — K&L Gates LLP

(57) ABSTRACT

Various examples are directed to electrical converters and systems for operating the same. An electrical converter may comprise a first converter module configured to receive a first direct current (DC) input and provide a first output. The first converter module may comprise a first switch modulated according to a first switch control signal. A second converter module may be configured to receive a second DC input and provide a second output. The second converter module may be connected in series with the first converter (Continued)

module. The second converter module may comprise a second switch modulated according to a second switch control signal. A phase of the first switch control signal may be offset from a phase of the second switch control signal by a first phase offset.

20 Claims, 12 Drawing Sheets

(51) Int. Cl.
*H02M 7/49* (2007.01)
*H02M 3/158* (2006.01)
(58) Field of Classification Search
CPC .. H02M 7/53873; H02M 3/158; H02M 3/156; H02J 3/00; H02J 1/00
USPC ........ 307/82, 80, 43, 66, 64; 363/40, 71, 98, 363/132; 323/299
See application file for complete search history.

(56) References Cited

U.S. PATENT DOCUMENTS

| | | | |
|---|---|---|---|
| 2008/0164766 A1* | 7/2008 | Adest | H02J 1/12 307/80 |
| 2012/0091817 A1* | 4/2012 | Seymour | H02J 3/383 307/82 |
| 2013/0127251 A1* | 5/2013 | Graovac | H02M 7/79 307/82 |
| 2013/0181527 A1 | 7/2013 | Bhowmik | |
| 2013/0181530 A1* | 7/2013 | Deboy | H02J 3/385 307/82 |
| 2014/0015326 A1* | 1/2014 | Eberhardt | H02J 3/383 307/82 |
| 2014/0049230 A1 | 2/2014 | Weyh | |
| 2014/0104899 A1 | 4/2014 | Fischer et al. | |
| 2014/0145508 A1* | 5/2014 | Wagoner | H02J 3/28 307/72 |
| 2014/0226377 A1 | 8/2014 | Goetz et al. | |
| 2014/0268932 A1* | 9/2014 | Gupta | H02M 7/493 363/40 |
| 2015/0372667 A1* | 12/2015 | Wang | H05B 33/0815 315/307 |

OTHER PUBLICATIONS

Written Opinion of the International Searching Authority for International Application No. PCT/US2015/061115, dated Feb. 3, 2016.

* cited by examiner

CONVERTER WITH PHASE-OFFSET SWITCHING

PRIORITY

This application claims the benefit of U.S. Provisional Application Ser. No. 62/080,492 filed on Nov. 17, 2014, entitled STAGGERING AND INTERLEAVING OF CONVERTERS AND INVERTERS TO INCREASE EFFECTIVE SWITCHING FREQUENCY, which is incorporated herein by reference in its entirety.

GOVERNMENT SUPPORT

This invention was made, at least in part, with government support under Award Number DE-EE0006459 awarded by the Department of Energy. The Government has certain rights in the invention.

GOVERNMENT SUPPORT DISCLAIMER

The information, data, or work presented herein was funded in part by an agency of the United States Government. Neither the United States Government nor any agency thereof, nor any of their employees, makes any warranty, express or implied, or assumes any legal liability or responsibility for the accuracy, completeness, or usefulness of any information, apparatus, product, or process disclosed, or represents that its use would not infringe privately owned rights. Reference herein to any specific commercial product, process, or service by trade name, trademark, manufacturer, or otherwise does not necessarily constitute or imply its endorsement, recommendation, or favoring by the United States Government or any agency thereof. The views and opinions of authors expressed herein do not necessarily state or reflect those of the United States Government or any agency thereof.

BACKGROUND

Converters are devices used to convert electricity from one form to another. For Converters include direct current (DC) to DC converters, and DC to alternating current (AC) converters, also referred to as inverters. DC-to-DC converters are used to modify the voltage, current and/or power of an input DC signal relative to an output DC signal. For example, step-up converters, such as boost converters, receive an input DC voltage and provide a higher output DC voltage. Step-down converters, such as buck converters, receive an input DC voltage and provide a lower output DC voltage. DC-to-DC converters are used in many types of equipment including, for example, in power supplies to modify and/or condition power provided to DC loads such as, for example, computers, mobile phones and other mobile computing devices, etc. DC-to-AC inverters receive a DC input voltage and provide an AC output voltage. Inverters are also used in many contexts where a DC source is used to power an AC load. For example, inverters are commonly used to couple batteries, photovoltaic panels, fuel cells, and other similar sources to the AC electrical grid.

Switched-mode converters convert electricity utilizing one or more switches (e.g., transistors) in conjunction with one or more passive components, such as capacitors or inductors. The switch or switches are periodically cycled between an open position and a closed position. Characteristics of the converter output are varied by modifying the duty cycle of the switch.

DETAILED DESCRIPTION

Figure 1:
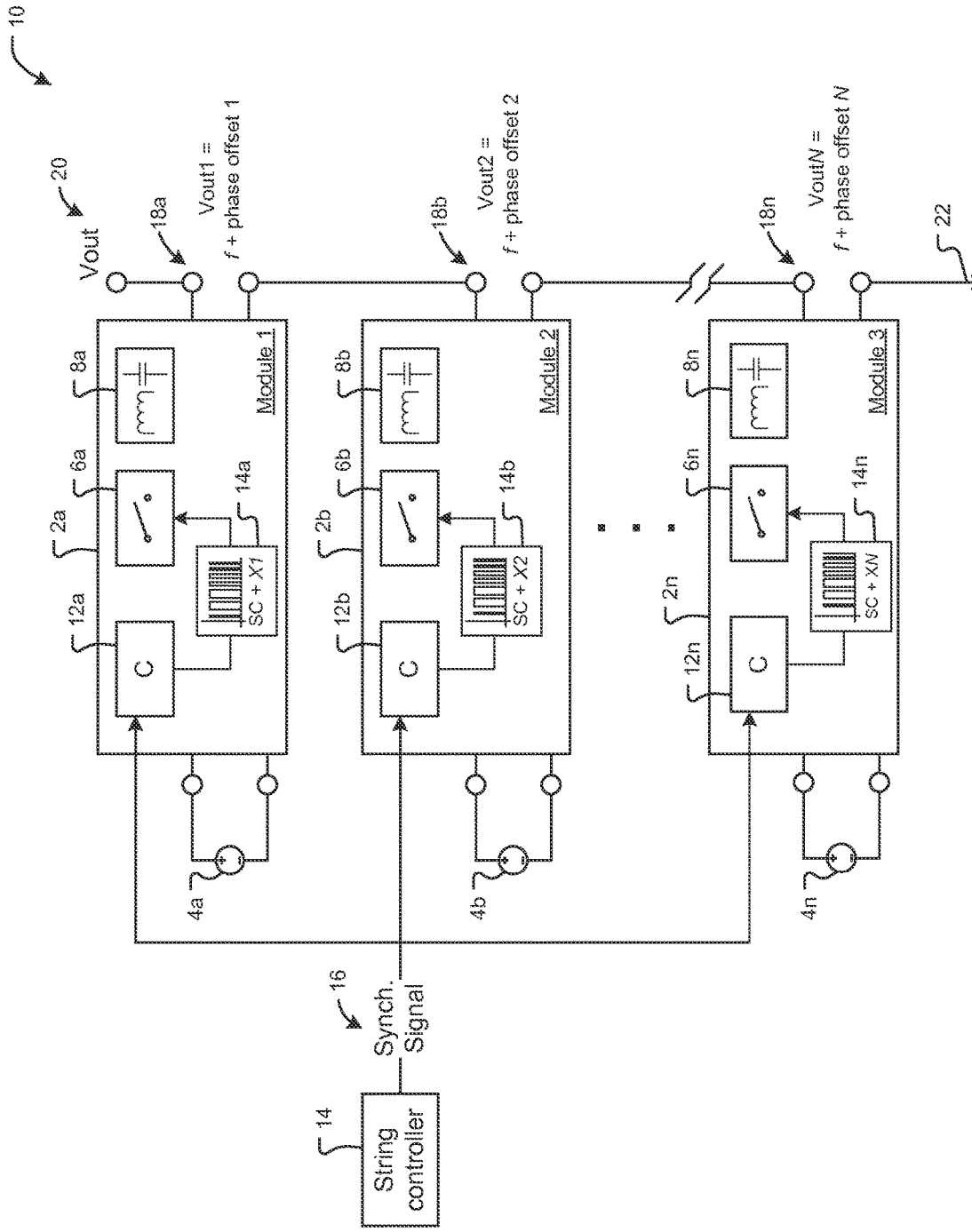
FIG. 1 is a diagram showing one example of a converter system utilizing phase-offset switch control signals.

Various examples described herein are directed to converter systems with series-connected converter modules that utilize phase-offset switching. Phase-offset switching is also referred to herein as interleaved switching. An example converter may comprise a plurality of converter modules that are electrically connected to one another in series. For example, each converter module may generate a module output. The converter modules may be electrically connected, as described herein, such that an output of the converter system is a sum of the individual converter module outputs. Switch control signals for the individual converter modules may be interleaved or offset in phase from one another. This may increase the effective switching frequency of the converter system. The effective switching frequency of the converter system may be indicated, in some examples, by the ripple of the summed output voltage of the converter modules. In some examples, increasing the effective switching frequency of the converter system without increasing the actual switching frequency may allow the converter system to utilize smaller and less expensive passive components without being penalized in higher switching losses in the switching components.

For example, in switched-mode converters, the switching action of the switch or switches may add additional switching losses and unwanted high-frequency content to the system output, such as, for example, frequency components at harmonics of the switching frequency. High-frequency content may be filtered from the output by the passive components (e.g., inductance and/or capacitance). Passive components for any particular converter design may be selected for filter design based upon the attenuation requirement of the high-frequency content from the output. For example, converter configurations that generate significant high-frequency content may use higher total inductance and/or capacitance to generate an acceptable output. Achieving higher total inductance and/or capacitance may require larger and more expensive components. For example, achieving higher inductances may require the use of large wound magnetic core inductors, which are larger and more expensive than alternate inductors. In various examples, the amount of high-frequency content generated by a converter or converter module may be determined by the switching frequency of the switch. For example, lower switching frequencies may introduce difficult to filter low frequency harmonics in the frequency range of interest than higher switching frequencies, requiring filter components with larger inductance and/or capacitance values.

Although higher switching frequencies may be desirable to reduce the inductance and/or capacitance in an inverter system, higher switching frequencies also have disadvantages. For example, higher switching frequencies generate higher switching losses requiring switching components—switches, gate drivers, gate resistors, heat dissipation mechanisms, etc. rated for higher switching frequencies, which may be larger, more expensive, and may dissipate more heat than lower switching frequency components. Also, as switching frequency increases, the effects of parasitic capacitance and inductance become more prominent, negatively impacting electromagnetic interference (EMI) or emissions requiring additional EMI filters that may further reduce the efficiency of the converter system. In various examples described herein, interleaving the switch control signals of series-connected converter modules may increase an effective switching frequency of the converter. For example, the converter may be able to utilize less expensive components sufficient to handle lower losses from lower switching frequency, less expensive and smaller inductance and/or capacitance and minimal EMI filters due to a resultant higher switching frequency.

FIG. 1 is a diagram showing one example of a converter system 10 utilizing phase-offset switch control signals. The converter system 10 comprises three converter modules 2a, 2b, 2n electrically coupled in series, although any suitable number of series-coupled converter modules may be used. Converter modules 2a, 2b, 2n may receive respective DC inputs from DC sources 4a, 4b, 4n. The DC sources 4a, 4b, 4n may include any suitable source or sources such as, for example, one or more batteries, one or more photovoltaic sources, one or more fuel cells, one or more wind mills, one or more internal combustion engines, one or more geothermal elements, etc. Each converter module 2a, 2b, 2n may generate a module output 18a, 18b, 18n. The module outputs 18a, 18b, 18n may be DC or AC. For example, when the converter system 10 is a DC-to-AC inverter, the outputs 18a, 18b, 18n may be AC. In some examples, because the converter modules 2a, 2b, 2n are connected in series, the output 20 of the converter system 10 is a sum of the outputs 18a, 18b, 18n of the respective converter modules 2a, 2b, 2n. For example, the output 20 may be measured relative to 22, which may be ground.

Each of the converter modules 2a, 2b, 2n may comprise one or more switches 6a, 6b, 6n, one or more passive components 8a, 8b, 8n and a control circuit 12a, 12b, 12n. Switches 6a, 6b, 6n may include any suitable type of switch such as, for example, one or more field-effect transistors (FETs) of any suitable fabrication technology, (e.g., power metal oxide semiconductor FET (MOSFET) and complementary metal oxide semiconductor (CMOS) FETs for low voltage applications, etc.). Other examples of switches 6a, 6b, 6c that may be used include bipolar junction transistors (BJTs), insulated gate bipolar transistors (IGBTs), Silicon Carbide junction gate FET (SiC JFET), Gallium Nitride High Electron Mobility Transistor (GaN HEMT) and any other similar switching devices suitable for switching power applications. Passive components 8a, 8b, 8n may include capacitive components (e.g., one or more capacitors) and/or inductive components (e.g. one or more inductors). In some examples, passive components 8a, 8b, 8n may be discrete components or realized by printed circuit board (PCB) embedded inductors or capacitors. In some examples, passive components 8a, 8b, 8n may be realized from other components of the circuitry of the converter modules 2a, 2b, 2n. For example, appropriately utilized parasitic inductance and/or capacitance from components in the converter modules 2a, 2b, 2n may be sufficient, in some examples, to reduce high-frequency emissions below threshold levels. Some examples of converter modules 2a, 2b, 2n may include additional components (not shown). Also, the configuration of components 6a, 6b, 6n, 8a, 8b, 8n, 12a, 12b, 12n and optional additional components in various examples may vary for different types of switched converters.

The control circuits, 12a, 12b, 12n may generate switch control signals 14a, 14b, 14n for the respective converter modules 2a, 2b, 2n. Switch control signals 14a, 14b, 14n may be binary signals that are either asserted (indicating that the respective switches 6a, 6b, 6n are to be closed) or un-asserted (indicating that the respective switches 6a, 6b, 6n are to be opened). Switch control signals 14a, 14b, 14n may be generated in any suitable manner. Switch control signals 14a, 14b, 14n may be pulse width modulated (PWM) to control the value of the respective outputs 18a, 18b, 18n. For example, the control circuits 12a, 12b, 12n may be configured to modify a duty cycle of the respective switch control signals 14a, 14b, 14n based on feedback from the respective outputs 18a, 18b, 18n (and/or system output 20). Converter modules 2a, 2b, 2n may be voltage-controlled or current-controlled. In voltage-controlled converter modules, the control circuit 12a, 12b, 12n may generate the switch control signal 14a, 14b, 14n based on the feedback to drive the output 18a, 18b, 18n to a desired or commanded voltage. In current-controlled converter modules, the control circuit 12a, 12b, 12n may generate the switch control signal 14a, 14b, 14n to maintain the output 18a, 18b, 18n at a desired or commanded current. The control circuits 12a, 12b, 12n may receive feedback in the form of the individual output 18a, 18b, 18n from the corresponding converter module 2a, 2b, 2n and/or the overall system output 20.

In various examples, the module control circuits 12a, 12b, 12n may generate the switch control signals 14a, 14b, 14n with phase offsets. For example, as shown in FIG. 1, the switch control signal 14a may be shifted by a phase offset X1. The switch control signal 14b may be shifted by a phase offset X2. The switch control signal 14n may be shifted by a phase offset XN. In various examples, the phase offsets X1, X2, XN, may be relative to a synchronization signal 16 that may, in some examples, be provided by a controller 14. For example, when the converter system 10 is an DC-to-AC inverter, the controller 14 may monitor the output 20 and generate a pulse at one or more times during the period of the output 20. The synchronization signal 16 may be or comprise various signal components such as a high accuracy external or internal clocks, grid voltage zero-cross or maximum, heartbeat signal generated by other mechanisms. For three phase systems, the synchronization signal may be calculated based on three phase voltages. In some examples, the three phase grid voltages may be effectively divided into multiple groups of vectors known as symmetrical components, i.e. positive sequence, negative sequence and zero-sequence. One group of symmetrical components for example, positive sequence may be used to calculate the effective zero-crossing points for all the phases. In some grid connected systems, the synchronization signal 16 may comprise the zero-crossings of the grid voltage as may be represented by the output 20. For example, in the United States, the grid voltage may have a frequency of approximately 60 Hz. In Europe, for example, the grid voltage may have a frequency of approximately 50 Hz.

The synchronization signal 16 may be provided to the respective module control circuits 12a, 12b, 12n using any suitable wired such as power line carrier (PLC) and/or wireless communications medium. In some examples, where the converter system 100 is an DC-to-AC inverter, for example, the synchronization signal 16 may be encoded onto a power grid (not shown in FIG. 1). Also, in some examples, the converter system 100 may comprise a communications bus for passing data between the system controller 14 and the respective module control circuits 12a, 12b, 12n. In some examples, the converter system 100 may utilize a wireless protocol such any suitable IEEE 802.11 protocol, any suitable Bluetooth™, Zigbee™ or similar protocol, any sort of near field communication protocol (NFC) or similar protocol, etc.

The phase offsets X1, X2, XN may be selected in any suitable manner. In some examples, phase offsets X1, X2, XN may be pro rata portions of a complete cycle (e.g., 360° (2π radians) or, for alternative interleaving impacts on harmonics, 180° (π radians)). For example, a phase offset unit for a 360° or 2π cycle may be found as indicated by Equation [1] below:

$$\text{Phase Offset Unit} = \frac{2\pi}{N} \quad [1]$$

In Equation [1], N is the number of converter modules 2a, 2b, 2n in the converter system 10. In Equation [1], the phase offset unit is expressed in radians but could be equivalently expressed in degrees by replacing the phase of each switch control signal 14a, 14b, 14n may be offset by a multiple of the phase offset unit. For example, the phase offset at any given converter module may be given by Equation [2] below:

Phase Offset=Phase Offset Unit×Phase Offset Multiplier [2]

In one example, X1 may be equal to the offset by the phase offset unit; X2 may be equal to twice the phase offset unit and XN may be equal to N times the phase offset unit. Although in this example, the converter modules 2a, 2b, 2n are electrically connected in order of increasing phase offset, some examples may be configured differently. Module control circuits 12a, 12b, 12n may implement phase offsets in any suitable manner. In some examples, each control circuit 12a, 12b, 12n may store a phase offset multiplier, for example, at a non-volatile data storage device. The phase offset multiplier may be received, for example, from the system controller 14. In some examples, the phase offset multiplier for a converter module 2a, 2b, 2n may be set and/or written to non-volatile data storage of the respective control circuit 12a, 12b, 12n at the time that the converter system 10 is manufactured. Also, in some examples, as described herein, the phase offset multiplier may be randomly selected by the respective control circuits 12a, 12b, 12n using, for example, any suitable random number generation technique. The control circuits 12a, 12b, 12n may be preprogrammed with the number of converter modules 2a, 2b, 2n in the converter system 10 (e.g., N) and/or may receive the number of converter modules 2a, 2b, 2n in the converter system 10 from the system controller 14. Randomly-generated phase offsets and/or phase offset multipliers, in some examples, may be generated by the system controller 14 and provided to the respective module control circuits 12a, 12b, 12n. In this way, the system controller 14 may, for example, configure the converter system 10 so that each module 2a, 2b, 2n or group of modules utilizes a distinct phase offset.

When the phase offset of the switch control signals 14a, 14b, 14n is distributed pro rata, as described with respect to Equations [1] and [2], the effective switching frequency of the converter 10 may be increased by a factor of about the number of converter modules in the system 10. For example, in a converter system comprising thirty (30) converter modules, each being switched at 500 kHz, the effective switching frequency at the system output 20 may be about 15 MHz, which is higher than the switching frequencies of the individual converter modules by about a factor of thirty. This synthetic switching frequency may permit individual converters to tolerate much higher ripple in the current waveforms thereby allowing reduction of inductance by a similar factor. For example, if with a switching frequency of 500 kHz, the example converter system used a 6 μH inductor, increasing the effective switching frequency to 15 MHz may allow the system to achieve similar results with an inductor that is 30 times smaller (e.g., 200 nH). In some implementations, the reduction in required inductance may be enough to allow the converter system to replace magnetic core inductors with air core inductors that may be integrated directly via layout on a Printed Circuit Board (PCB).

In some examples, the phase offsets X1, X2, XN may be randomly selected. For example, each of the module control circuits 12a, 12b, 12n may be programmed to randomly select a phase offset. Random phase offsets may be implemented in any suitable manner. In some examples, the module control circuits 12a, 12b, 12n may utilize Equations [1] and [2] above, but each module control circuit 12a, 12b, 12n may randomly select a phase offset multiplier. In some examples, each module control circuits 12a, 12b, 12n may randomly select the phase offset itself.

The system controller 14 and the various control circuits 12a, 12b, 12n may be implemented using any suitable type of hardware. In some examples, the system controller 14 and/or the various control circuits 12a, 12b, 12n may comprise one or more processors and associated volatile and/or non-volatile data storage or other computing device components. For example, the system controller 14 and/or the various control circuits 12a, 12b, 12n may comprise a Digital Signal Processor (DSP). In addition to or instead of a processor and computing device components, the system controller 14 and various control circuits 12a, 12b, 12n may include any other suitable hardware such as, for example, comparators, amplifiers, filters, logic gates, etc.

In various examples, each converter module 2a, 2b, 2n may be operated with switch control signals 14a, 14b, 14n having different phase offsets. In other examples, however, groups of converter modules 2a, 2b, 2n may be operated with switch control signals 14a, 14b, 14n having the same phase offset. For example, referring to FIG. 1, converter modules 2a, and 2b may operate with switch control signals 14a, 14b having the same phase offset while the switch control signal 14*n* is phase-offset from the switch control signals 14*a*, 14*b*. In examples where groups of converter modules are operated with switch control signals having the same phase offset, and utilizing the pro rata offset described with respect to Equations [1] and [2], the effective switching frequency may be the actual switching frequency multiplied by the number of groups of converter modules using distinct phase offsets.

Figure 2:
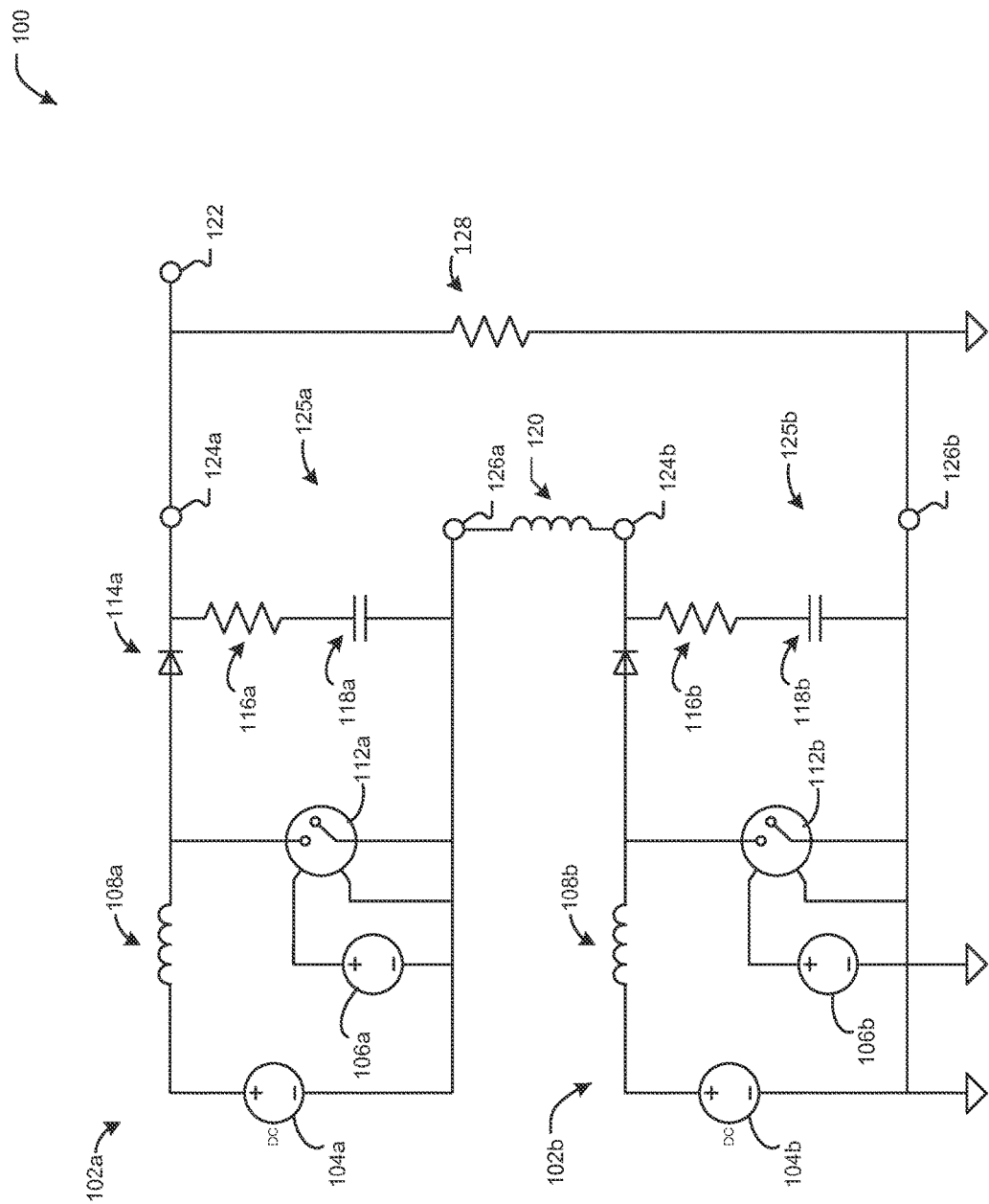
FIG. 2 is a diagram showing one example of a step-up converter system utilizing phase-offset switch control signals.

FIG. 2 is a diagram showing one example of a step-up or boost converter system 100 utilizing interleaved switch control signals. The converter system 100 comprises two converter modules 102*a*, 102*b*. Each converter module 102*a*, 102*b* comprises a DC source 104*a*, 104*b* and a switch 112*a*, 112*b*. Switches 112*a*, 112*b* are driven switch control signals 106*a*, 106*b*, represented in FIG. 2 as voltage sources. Passive components in the modules 102*a*, 102*b* may include inductors 108*a*, 108*b* and capacitors 118*a*, 118*b*. Modules 102*a*, 102*b* may also include additional components such as diodes or switches 114*a*, 114*b*. Resistors 116*a*, 116*b* may be discrete components and/or may represent the equivalent series resistance (ESR) as integral loss elements of capacitors 118*a*, 118*b*. Inductor 120 may represent parasitic line inductances in and between the modules 102*a*, 102*b*. As illustrated, the modules 102*a*, 102*b* are connected in series such that a system output 122 (dropped across a load 128) is the sum of the outputs of the converter modules 102*a*, 102*b*. For example, the output 125*a* of module 102*a* may be between 124*a* and 126*a*. Similarly, the output 125*b* of the module 102*b* may be between 124*b*, 126*b*.

As described herein, the respective switch control signals 106*a*, 106*b* may have offset phases. For example, the switch control signal 106*a* may have a phase offset from the phase of the switch signal 106*b* by $\pi$ radians (180°). Referring to Equations [1] and [2], because there are two converter modules 102*a*, 102*b* in the converter system 100, the phase offset unit may be $\pi$ radians (Equation [1]). Accordingly, the first switch control signal 106*a* may be offset from a synchronization signal (not shown in FIG. 2.) by $\pi$ radians, while the second switch control signal 106*a* may be offset from the synchronization signal by $2\pi$ radians, meaning that the phase difference between the switch control signals 106*a*, 106*b* may be $\pi$ radians. Also, in some examples, the first switch control signal 106*a* may be in-phase with the synchronization signal while the second switch control signal 106*b* may be phase-shifted by $\pi$ radians.

Figure 3:
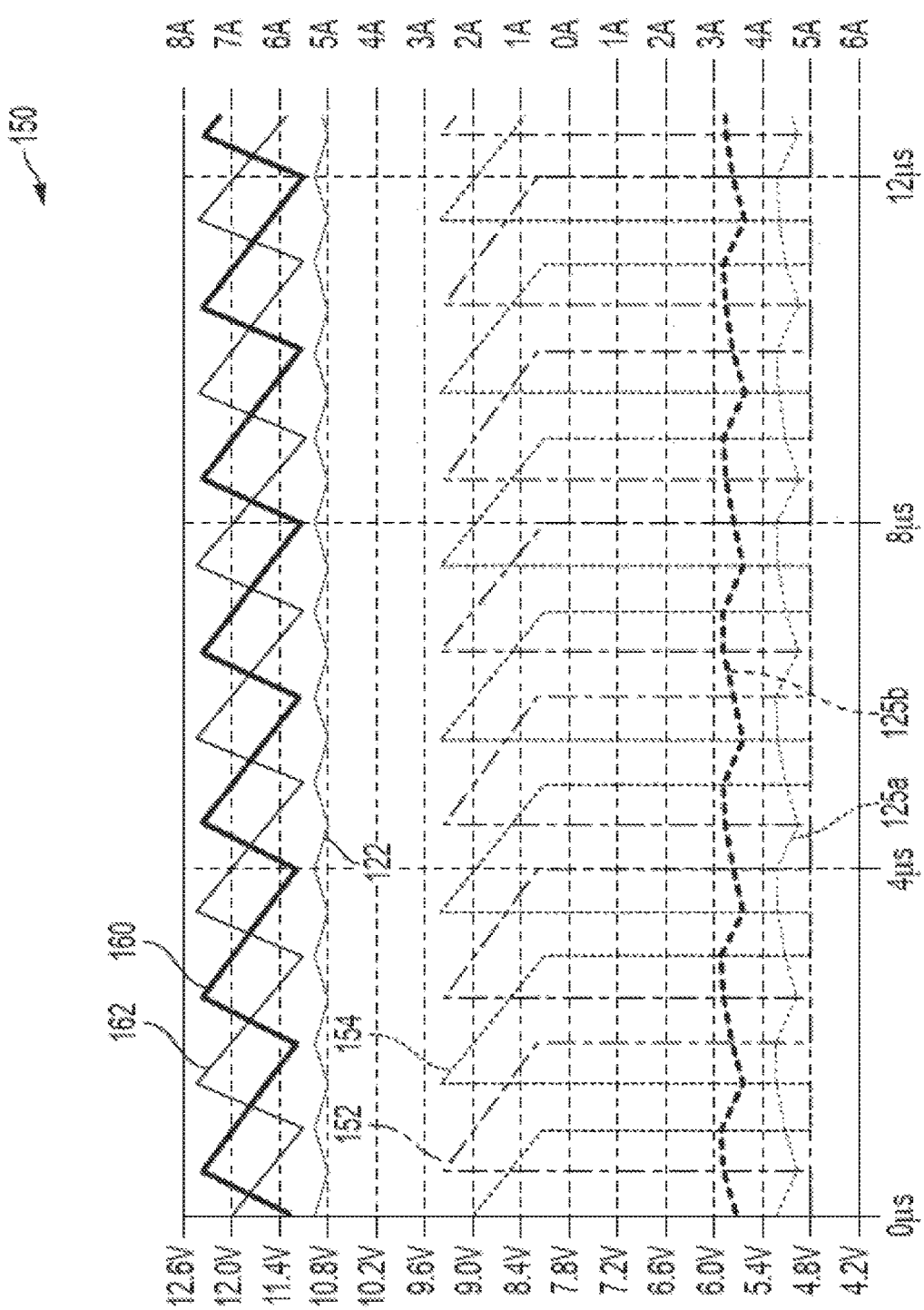
FIG. 3 is a chart showing example output waveforms of the converter system of FIG. 2.

FIG. 3 is a chart 150 showing example output voltage and current profiles of the converter system 100. In the examples shown in the chart 150, the switch control signals 106*a*, 106*b* are at approximately 500 kHz and are phase-shifted relative to one another by $\pi$ radians. Current through the capacitor 118*a* is given by waveform 152. Current through the capacitor 118*b* is given by waveform 154. Current through the inductor 108*a* is given by waveform 160; and current through the inductor 108*b* is given by waveform 162. The outputs 125*a* and 125*b* of the respective converter modules 102*a*, 102*b* are shown. Each of the outputs 125*a*, 125*b* exhibits a ripple of approximately 500 kHz, matching the actual switching frequency of the switch control signals 106*a*, 106*b*. Because the switch control signals 106*a*, 106*b* are out of phase by $\pi$ radians, ripple on the outputs 125*a*, 125*b* is also out of phase by about $\pi$ radians. The system output 122 shows a ripple that has a frequency of approximately double the frequencies of the ripples on the outputs 125*a*, 125*b* (e.g., approximately 1 MHz). Accordingly, in the example shown in FIG. 3, the effective switching frequency of the converter system 100 may be about 1 MHz, or about two times the actual switching frequency of 500 kHz. In various examples, if the desired effective or resultant switching frequency is 500 kHz two times lower capacitance (e.g., from capacitors 118*a*, 118*b*) may be utilized for each converter than those at the original 500 kHz switching frequency. If the capacitors are maintained at the same values of those at the original 500 kHz switching frequency then 2 times lower inductances (e.g., from inductors 108*a*, 108*b*) may be employed without compromising the effective output voltage ripple.

Figure 4:
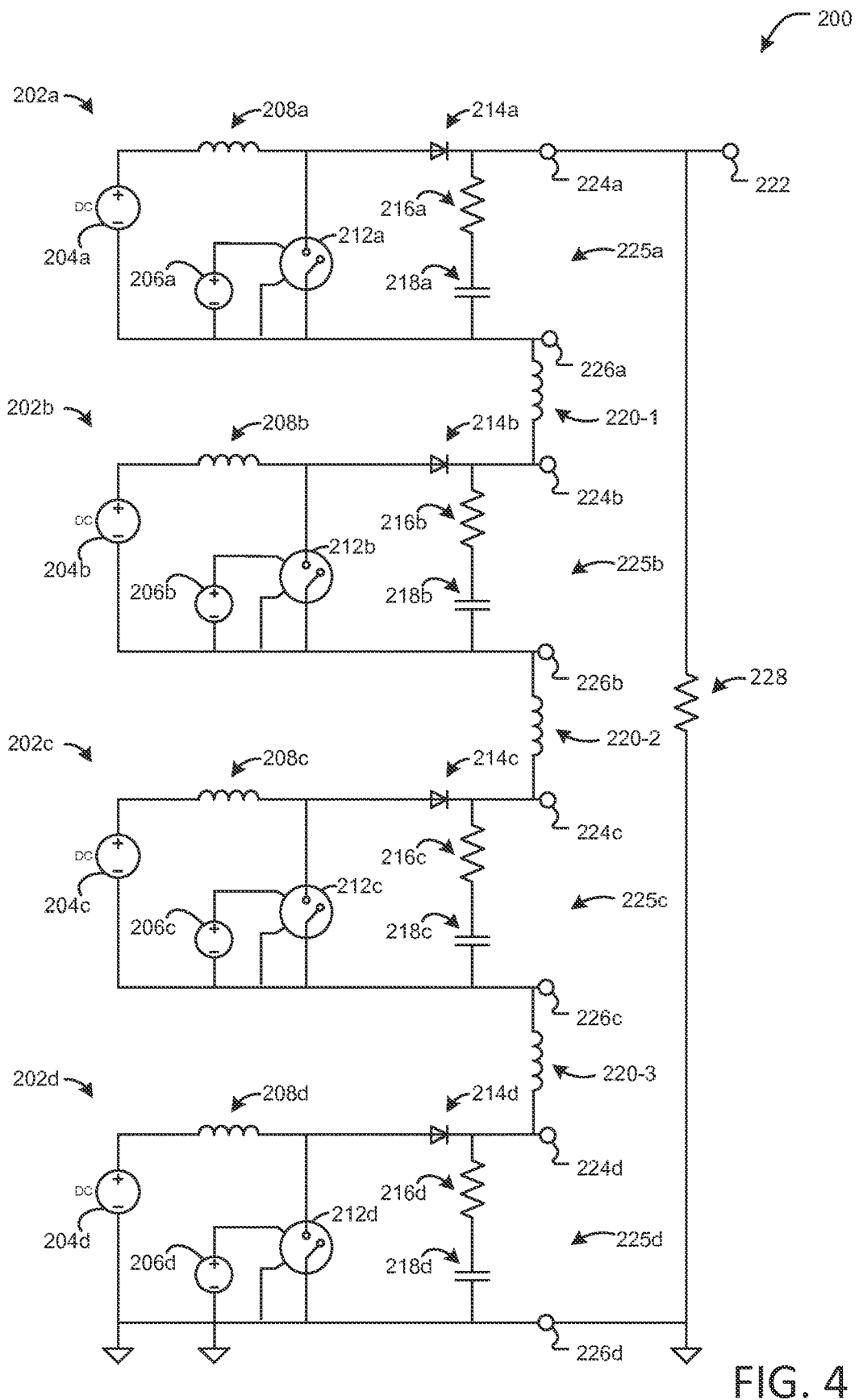
FIG. 4 is a diagram showing another example of a step-up converter system utilizing phase-offset switch control signals.

FIG. 4 is a diagram showing another example of a step-up converter system 200 utilizing phase-offset switch control signals. The converter system 200 may include four converter modules 202*a*, 202*b*, 202*c*, 202*d* having configurations similar to the modules 102*a*, 102*b* of the converter system 100. Each converter module 202*a*, 202*b*, 202*c*, 202*d* may comprise a DC source 204*a*, 204*b*, 204*c*, 204*d* and a switch 212*a*, 212*b*, 212*c*, 212*d*. Switches 212*a*, 212*b*, 212*c*, 212*d* may be driven by control signals 206*a*, 206*b*, 206*c*, 206*d*, represented in FIG. 4 as voltage sources. Passive components in the modules 202*a*, 202*b*, 202*c*, 202*d* may include inductors 208*a*, 208*b*, 208*c*, 208*d* and capacitors 218*a*, 218*b*, 218*c*, 218*d*. Modules 202*a*, 202*b*, 202*c*, 202*d* may include additional components, such as diodes 214*a*, 214*b*, 214*c*, 214*d* and resistors 216*a*, 216*b*, 216*c*, 216*d*. Inductors 220-1, 220-2, 220-3 may represent line inductance in and between the modules 202*a*, 202*b*, 202*c*, 202*d*.

As illustrated, the modules 202*a*, 202*b*, 202*c*, 202*d* are connected in series such that a system output 222 (dropped across a load 228) is the some of the outputs of the converter modules 202*a*, 202*b*, 202*c*, 202*d*. For example, the output 225*a* of the module 202*a* may be taken between terminals 224*a* and 226*a*. The output 225*b* of the module 202*b* may be taken between terminals 224*b* and 226*b*. The output 225*c* of the module 202*c* may be taken between terminals 224*c* and 226*c*. The output 225*d* of the module 202*d* may be taken between terminals 224*d* and 226*d*. (Terminal 226*d*, as shown, may be at ground).

Figure 5:
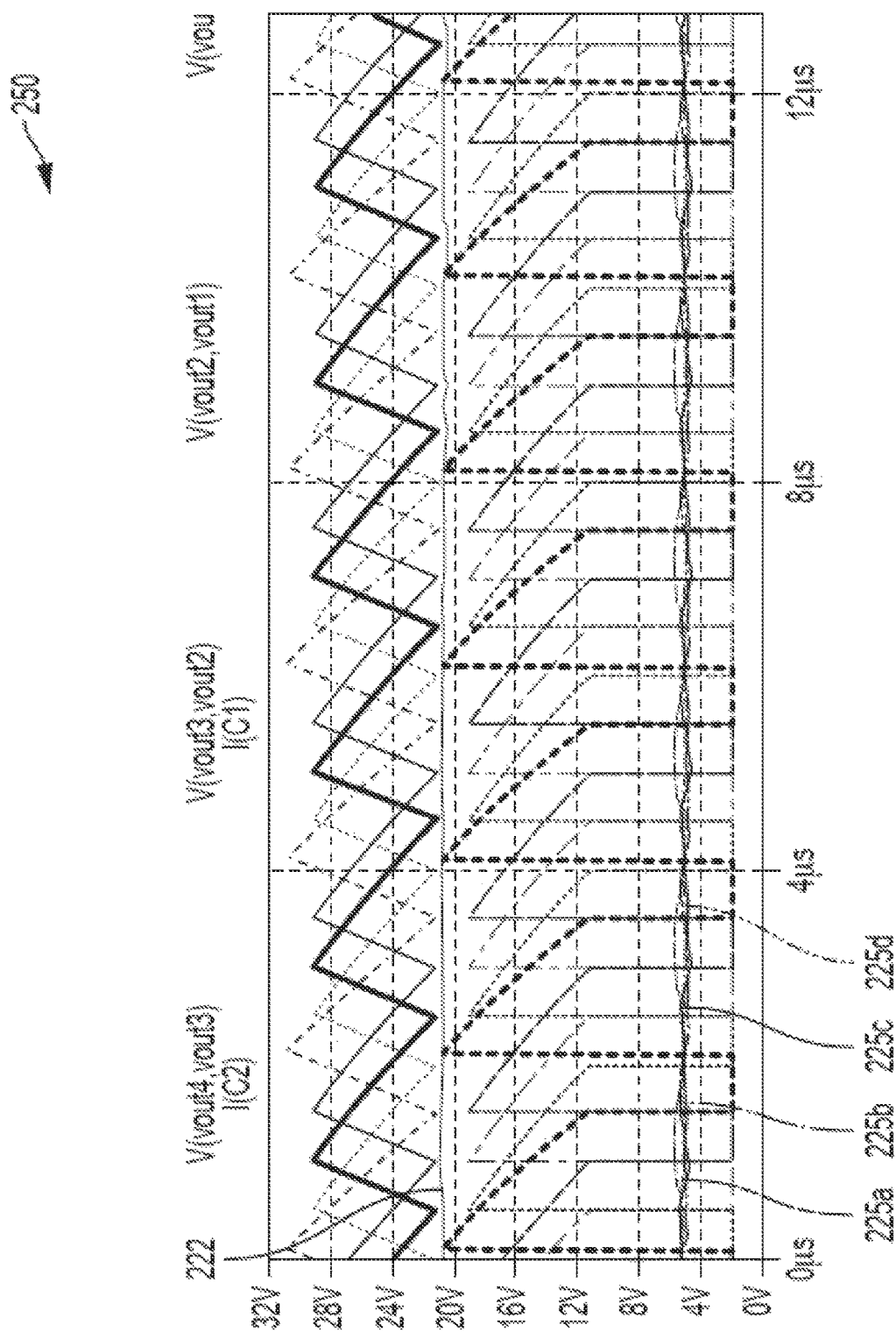
FIG. 5 is a chart showing example output waveforms of the converter system of FIG. 4.

FIG. 5 is a chart 250 showing example output waveforms of the converter system 200. In the example illustrated in chart 250, the switch control signals 206*a*, 206*b*, 206*c*, 206*d* are at approximately 500 kHz and are phase-shifted relative to one another by $\pi/2$ radians. The outputs 225*a*, 225*b*, 225*c*, 225*d* of the respective converter modules 202*a*, 202*b*, 202*c*, 202*d* are shown. Each of the outputs 225*a*, 225*b*, 225*c*, 225*d* exhibits a ripple of approximately 500 kHz, matching the actual switching frequency of the switch control signals 206*a*, 206*b*, 206*c*, 206*d*. Because the switch control signals 206*a*, 206*b*, 206*d*, 206*c* are out of phase by $\pi/2$ radians, ripple on the outputs 225*a*, 225*b*, 225*c*, 225*d* is also out of phase by about $\pi/2$ radians. The system output 222 shows a ripple that has a frequency of approximately four times the frequencies of the outputs 225*a*, 225*b*, 225*c*, 225*d* (e.g., approximately 2 MHz). Accordingly, in the example of FIG. 3, the effective switching frequency of the converter system 200 may be 2 MHz. As explained previously, this may allow the system 200 to be designed with lower inductances and/or capacitances than if the system 200 were operated with the switch control signals 206*a*, 206*b*, 206*c*, 206*d* in phase.

Figure 6:
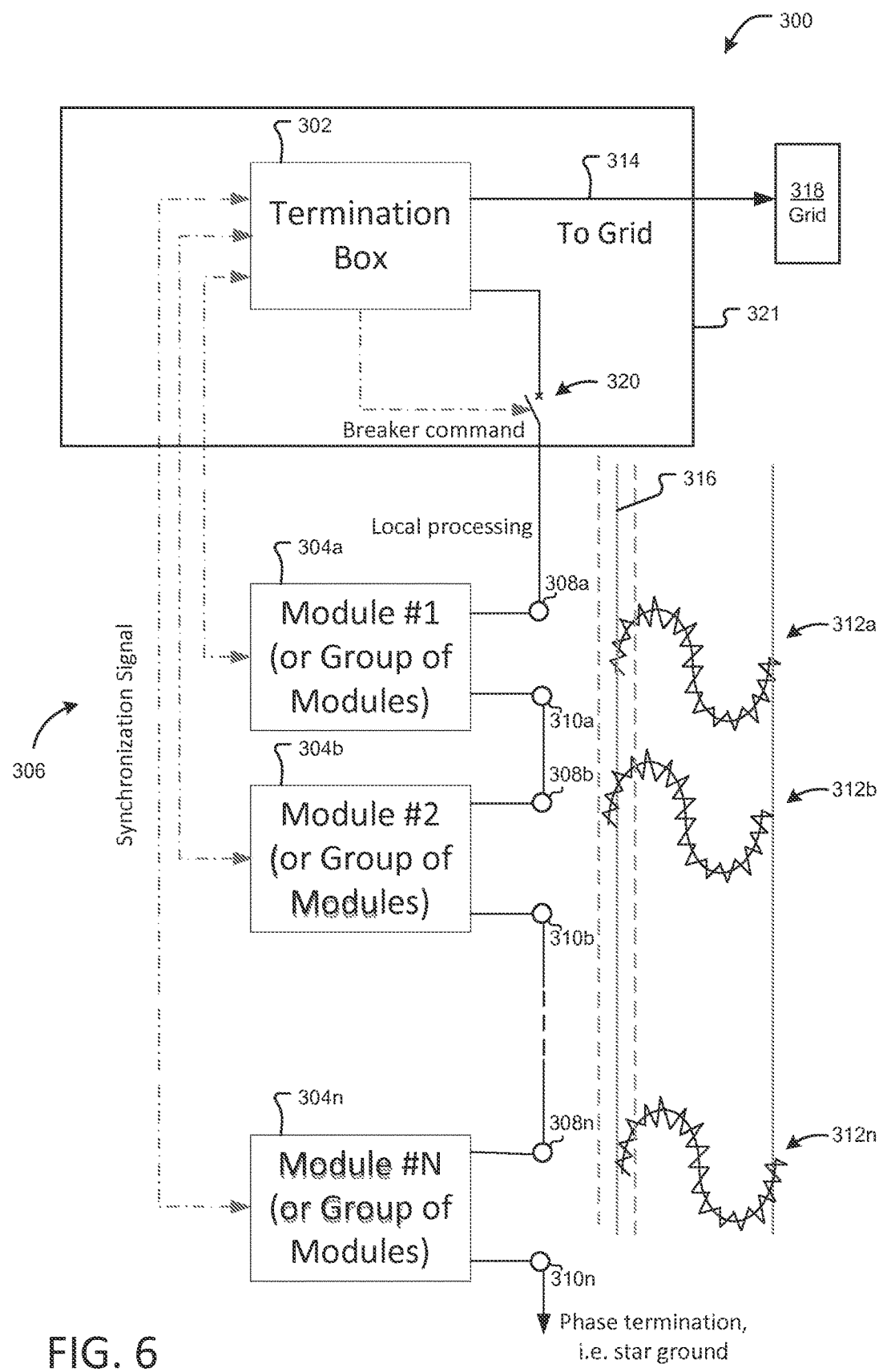
FIG. 6 is a diagram showing one example of an inverter system utilizing interleaved switch control signals.
Figure 7:
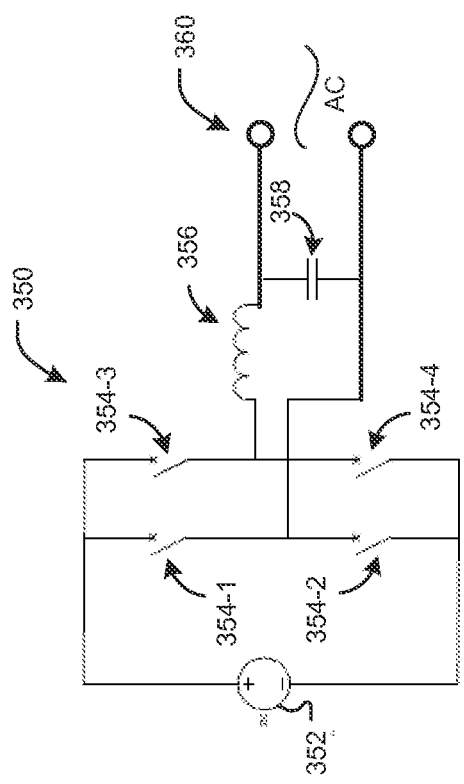
FIGS. 7-11 are diagrams showing example of a circuit configuration for an inverter module that may be used in various systems described herein.

FIG. 6 is a diagram showing one example of an inverter system 300 utilizing phase-offset switch control signals. The inverter system 300 may be configured to convert inputs from DC sources such as photovoltaic sources (not shown in FIG. 6) into an AC output that may be suitable for provision to an electrical grid 318. The inverter system 300 may comprise any suitable number of inverter modules 304*a*, 304*b*, 304*n*. Each inverter module 304*a*, 304*b*, 304*n* may be configured to receive a DC input from a DC source (not shown in FIG. 6) and provide a suitable AC output. Inverter modules 304a, 304b, 304n may comprise, for example, any type of DC-to-AC inverter or other inverters that allow series connection of their outputs, etc. An output 312a of the inverter module 304a may be provided between 308a and 310a. An output 312b of the inverter module 304b may be provided between 308b and 310b. An output 312n of the inverter module 304n may be provided between 308n and 310n. Example configurations for inverter modules such as 304a, 304b, 304n are provided herein with respect to FIGS. 7-11 below. The inverter modules 304a, 304b, 304n may be electrically coupled in series, as illustrated, such that a system output 314 of the inverter system 300 is a sum of the outputs 312a, 312b, 312n of the respective inverter modules 304a, 304b, 304n.

The inverter system may comprise a termination box 302 electrically coupled between the inverter modules 304a, 304b, 304n and an electrical grid 318. The termination box 302 may comprise an interface to couple to an existing electrical grid 318, or alternatively can include an interface to couple to a stand-alone power system, an AC motor drive, and/or other AC loads. The termination box 302 may comprise various components for interfacing the output 314 to the electrical grid 318 including, for example, one or more grid connection filters, one or more breakers 320, etc. In some examples, the breaker 320 may be included in a common enclosure 321. In some examples, the termination box 302 may also comprise a system controller, similar to the system controller 14 described herein above.

The inverter modules 304a, 304b, 304n may be configured to be current controller and/or voltage controlled. In some examples, one of the inverter modules 304a, 304b, 304n may be configured to operate in a current controlled mode while the remaining inverter modules 304a, 304b, 304n operate in voltage controlled mode. Other configurations may be used, however. In some examples, all inverter modules 304a, 304b, 304n may be operated in a current controlled mode. Also, in some examples, all inverter modules 304a, 304b, 304n may be operated in a voltage controlled mode. Additionally, in some examples, one of the inverter modules 304a, 304b, 304n may be operated in a voltage controlled mode while the remaining inverter modules 304a, 304b, 304n may be operated in a current controlled mode.

The modules 304a, 304b, 304n of the inverter system 300 may operate with offset or interleaved switch control signals, as described herein. For example, FIG. 6 includes graphical representations of the module outputs 312a, 312b, 312n including an unfiltered jagged form and a filtered smooth form. In the jagged form of the outputs 312a, 312b, 312n, the frequency of the jagged line may represent the actual switching frequency at the modules 304a, 304b, 304n. The smooth form of the outputs 312a, 312b, 312n represents the form of the outputs 312a, 312b, 312n post-filtering. A zero-cross reference line 316 is also shown intersecting the outputs 312a, 312b, 312n. As shown, each of the outputs 312a, 312b, 312n are offset from the zero-cross reference line 316. Controllers (not shown in FIG. 6) of the respective inverter modules 304a, 304b, 304n may receive a synchronization signal 306 (e.g., from the termination box 302). The synchronization signal 306 may indicate zero-crossings of the grid 318. The control circuits of the respective inverter modules 304a, 304b, 304n may offset their respective switch control signals by a phase offset, as described herein. Each inverter module 304a, 304b, 304n may have a defined phase offset for its switch control signal, for example, as described herein with respect to Equations [1] and [2]. Also, in some examples, as described herein, each inverter modules 304a, 304b, 304n may have a randomly-generated phase offset and/or phase offset multiplier.

Figure 11:
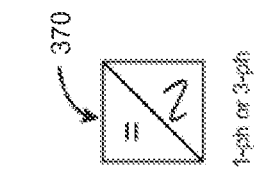
Figure 10:
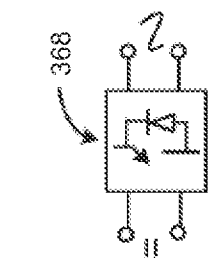
Figure 9:
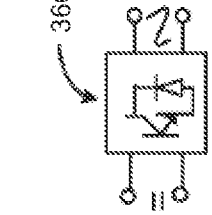
Figure 8:
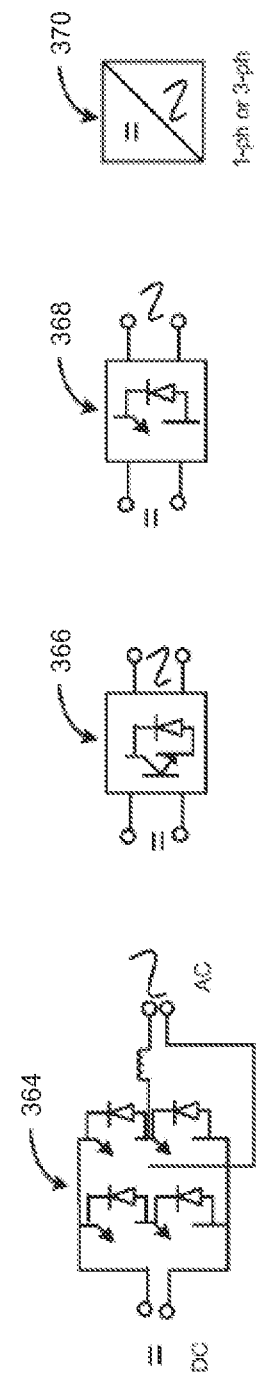

FIGS. 7-11 are diagrams showing example of a circuit configuration for an inverter module that may be used, for example, as one or more of the inverter modules 304a, 304b, 304n. The inverter module 350 shown in FIG. 7 comprises a DC source 352. Four switches 354-1, 354-2, 354-3 are shown along with passive components including an inductor 356 and a capacitor 358. The four switches 354-1, 354-2, 354-3, 354-4 may be operated in an independent or complimentary manner dependent upon the switching controller configuration. For example, the switches 354-1, 354-2, 354-3, 354-4 may be switched according to unipolar or bipolar switching configurations. An output 360 of the inverter module 350 may be present across the capacitor 358. FIG. 8 shows an inverter module 364 that can be included as an inverter module in an inverter system, such as 300. For example, the DC terminal of inverter 362 may be connected to a photovoltaic (PV) panel to receive an output from the photovoltaic panel (or other suitable DC source). FIGS. 9 and 10 show inverter modules 366 and 368, respectively, that may be included as inverter modules in an inverter system, such as 300. FIG. 11 illustrates another example inverter module 370 that can be included in one or more string members. In some examples, the inverter modules 364, 366, 368, 370 may include additional components and/or circuits that are not illustrated for simplicity purposes.

Figure 12:
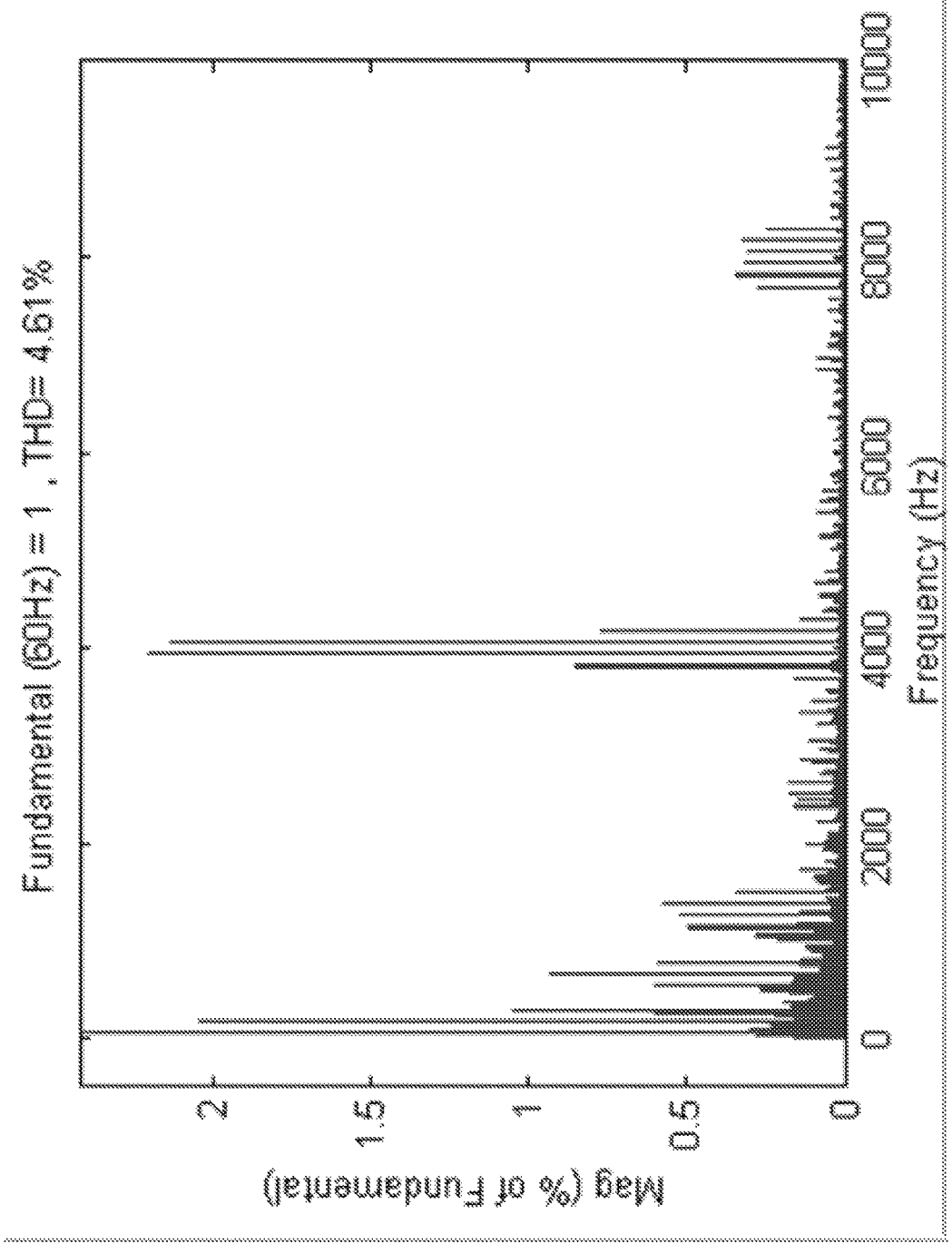
FIG. 12 is a chart showing the frequency content of a system output of one example of the inverter system of FIG. 6.

FIG. 12 is a chart showing the frequency content of a system output of one example of the inverter system 300. The example of FIG. 12 shows simulation results for the inverter system 300 comprising four inverter modules of the configuration shown in FIG. 7 and utilizing switch control signals in a bipolar configuration with a switching frequency of 2 kHz and no phase shift. As illustrated, the total harmonic distortion (THD) of the output is 4.61%, which may be with the IEEE 519 recommended limit of 5%. Despite this, however, large harmonics are visible around 4 kHz and 8 kHz (e.g. because bipolar switching is used, the effective line-to-line switching frequency may be 4 kHz, resulting in the harmonics at 4 kHz and 8 kHz).

Figure 13:
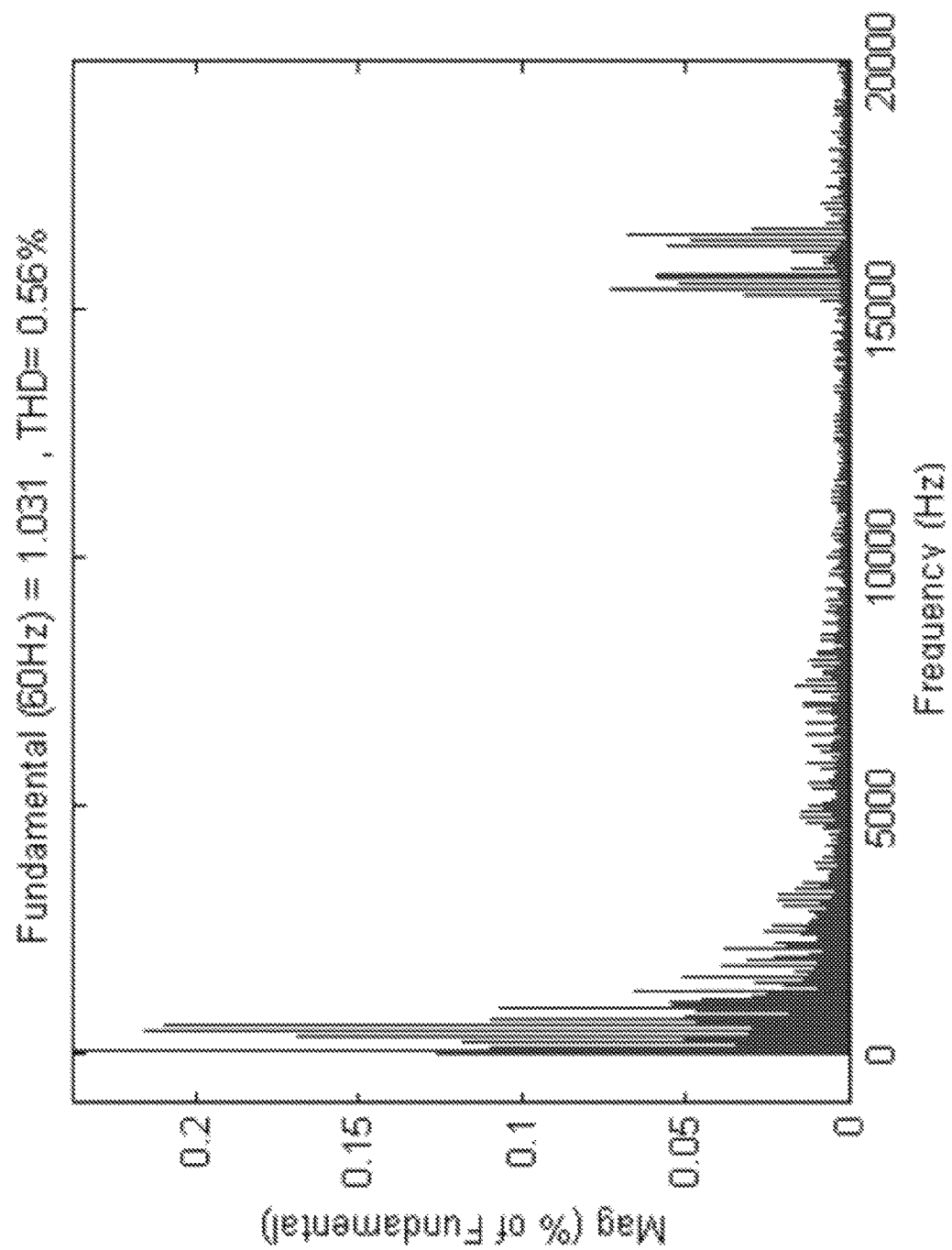
FIG. 13 is a chart showing the frequency content of the system output of another example of the inverter system of FIG. 6.

FIG. 13 is a chart showing the frequency content of the system output of another example of the inverter system 300. The example of FIG. 13 shows simulation results for the inverter system 300 comprising four inverter modules of the configuration shown in FIG. 7 and utilizing a bipolar 2 kHz switching frequency (e.g., causing an effective line-to-line switching frequency may be 4 kHz). Switch control signals utilized in the example of FIG. 13, however, may be interleaved or phase-shifted with a pro rata phase shift over a 180° or π cycle (e.g., as described above with respect to Equations [1] and [2]). For example, with four inverter molecules, the phase offset unit may be π/4 radians or 45°. Accordingly, the switch control signals of the four inverter modules may be offset by 0 radians (0°), π/4 radians (45°), π/2 radians (90°), and 3π/4 radians (135°) relative to the synchronization signal. As a result, the effective switching frequency of the inverter modules may be increased by a factor of four from 4 kHz to 16 kHz. The THD of the system output may be reduced to 0.56%, as shown. In this one example, then, utilizing phase-shifted or interleaved switch control signals may decrease the THD nearly nine-fold. Despite the bipolar 2 kHz switching frequency of the converter modules, the 4000 Hz and 8000 Hz harmonics are reduced relative to the example of FIG. 12. Relevant magnitude harmonics may be pushed above 15 kHz, which may allow utilization of smaller filter components.

Figure 14:
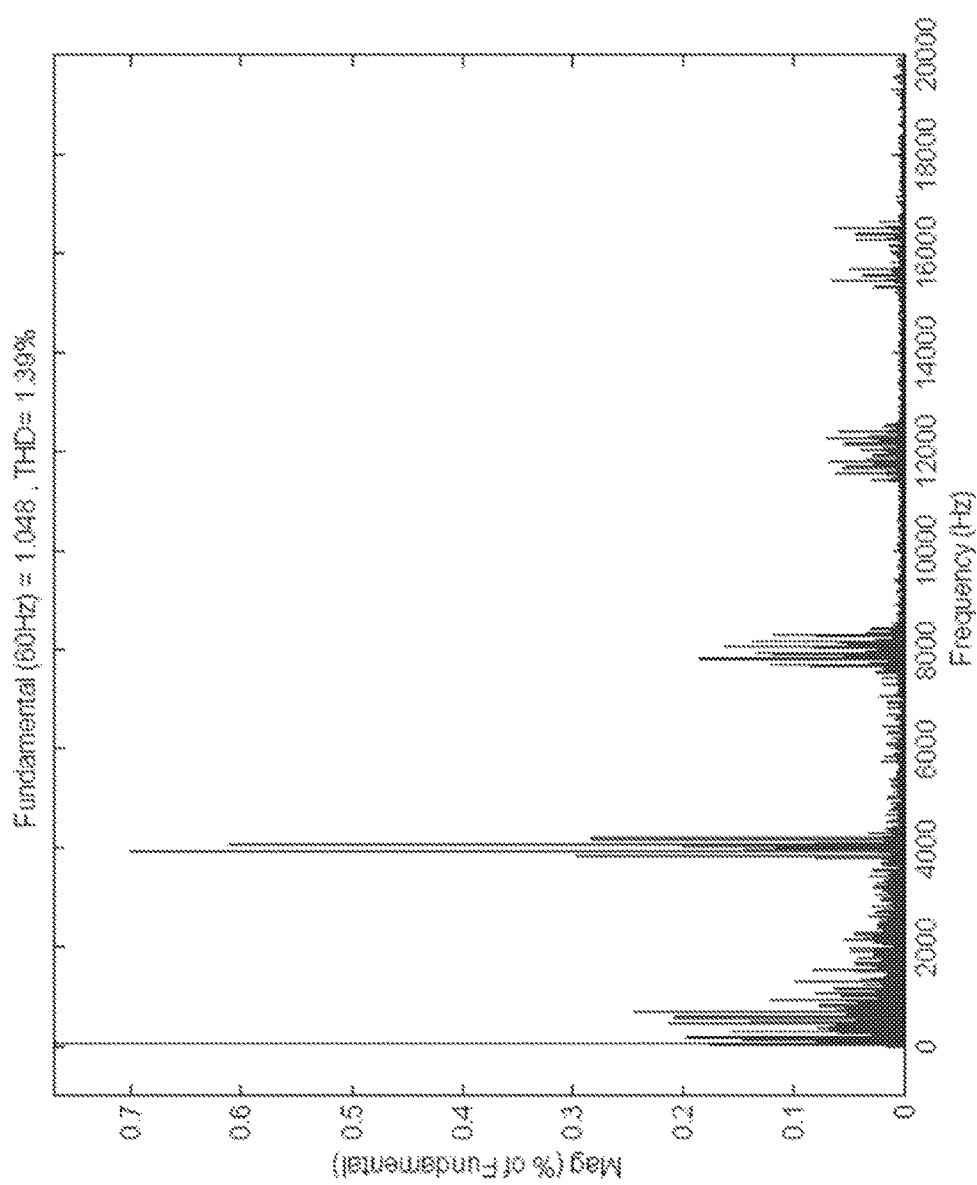
FIG. 14 is a chart showing the frequency content of the system output of another example of the inverter system of FIG. 6.

FIG. 14 is a chart showing the frequency content of the system output of another example of the inverter system 300. In the example of FIG. 14, the inverter system 300 comprises four inverter modules of the configuration shown in FIG. 7, each utilizing a 2 kHz bipolar switching frequency (e.g., causing an effective line-to-line switching frequency may be 4 kHz). Switch control signals utilized in the example of FIG. 14 are interleaved or phase-shifted with a pro rata phase shift over a 360° or $2\pi$ cycle (e.g., as described above with respect to Equations [1] and [2]). For example, with four inverter molecules, the phase offset unit may be $\pi/2$ radians or 90°. Accordingly, the switch control signals of the four inverter modules may be offset by 0 radians (0°), $\pi/2$ radians (90°), $\pi$ radians (180°), and $3\pi/2$ radians (270°) relative to the synchronization signal. As illustrated, the THD of the output is 1.39% and harmonics are visible at 4 kHz, 8 kHz, 12 kHz and 16 kHz. This provides a considerable improvement over the system output with no phase offset described with respect to FIG. 12. In some examples, phase offsets of the switch control signals may be randomly selected. Randomly-selected phase offsets may lead to improvements in THD when compared to examples where switch control signals are not phase-offset. FIG. 13 and FIG. 14 illustrate the different resultant harmonic signature due to the two different phase shifting mechanisms. In both cases, the resultant total harmonic distortion (THD) is significantly lower than in the system without any phase shift as captured by the spectrum in FIG. 12.

Figure 15:
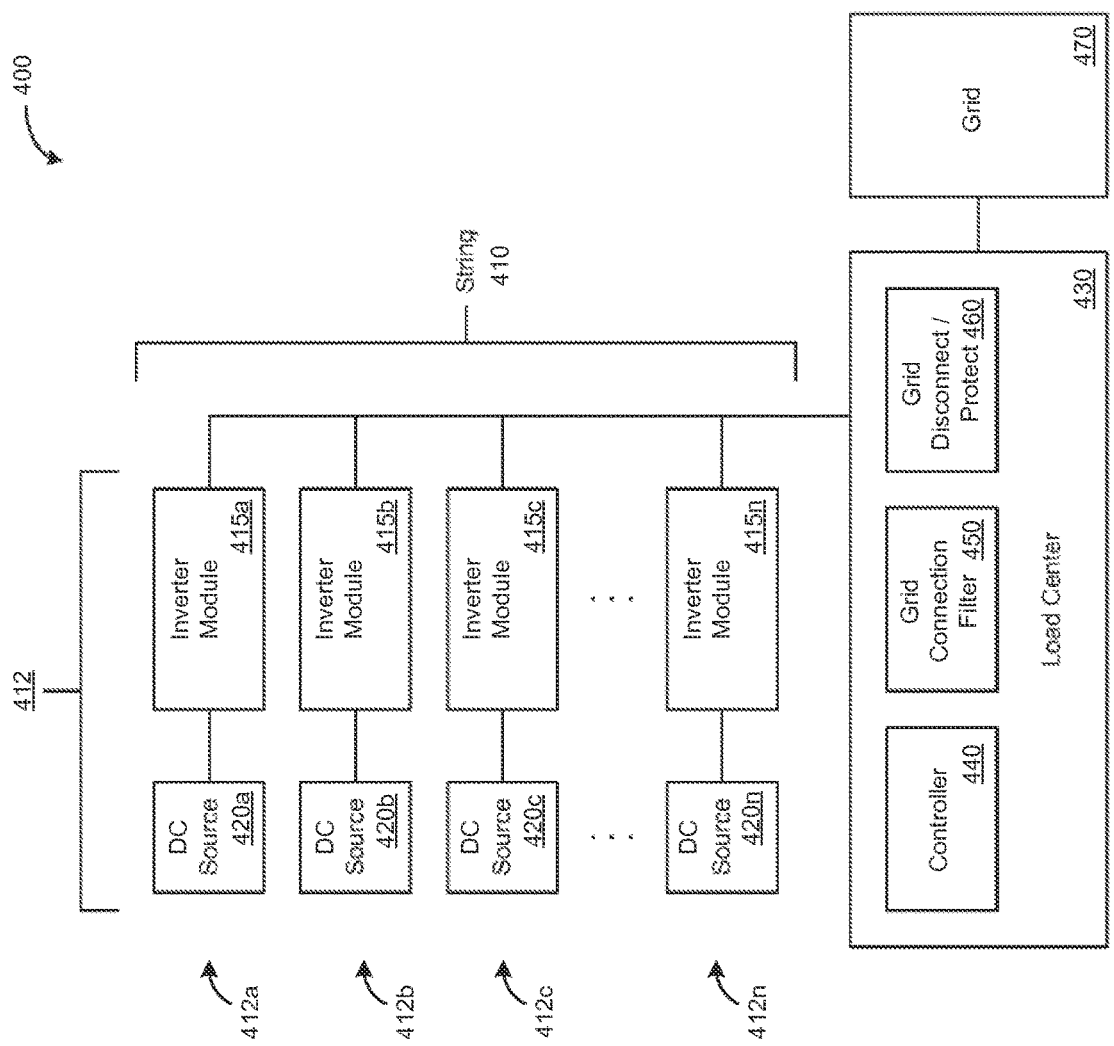
FIG. 15 shows one example of an inverter system that may be operated with phase-offset switch control signals.

FIG. 15 shows one example of an inverter system 400 that may be operated with phase-offset switch control signals, as described herein. In some examples, the system 400 includes one or more strings 410 and a central load center 430. The load center 430 may be similar to the termination box 302 described in FIG. 6 above. The load center 430 may include an interface to couple to a stand-alone power system, an AC motor drive, electrical grid 470, and/or other AC resistive loads. For simplicity purposes, only one string 410 is illustrated in FIG. 15, although multiple strings 410 could be coupled to the load center 430 in some examples. Each string 410 may includes a plurality of string members 412a, 412b, 412c, 412n. Respective string members 412a, 412b, 412c, 412n may comprise inverter modules 415a, 415b, 415c, 415n, as described herein, coupled to respective DC sources 420a, 420b, 420c, 420n. Inverter modules 415a, 415b, 415c, 415n may be electrically coupled to one another in series as shown. For example, each string 410 may be configured in a manner similar to the inverter modules 304a, 304b, 304n of the example inverter system 300 described with respect to FIG. 6. Referring back to FIG. 15, inverter modules 415a, 415b, 415c, 415n of a string 410 may be operated with phase-offset switch control signals, as described herein.

In one example, the inverter system 400 may include ten string members 412 as part of a string 410. The string members 412 may be connected in series with each voltage source being a photovoltaic panel for generating energy from sunlight. The inverter system 400 may be used to convert DC energy into AC energy at the photovoltaic panel level (e.g., at each string member 112) in a single stage conversion, and sum the voltage that is output from each string member 412 on the string 410 in order to couple to the electrical grid 470.

In some examples, the inverter system 400 also includes one or more controllers 440, one or more grid connection filters 450, and one or more grid disconnect/protects 460 that can be incorporated as part of the load center 430. In other embodiments, the controllers 440, the grid connection filters 450, and/or the grid disconnect/protects 460 can be provided separately from the load center 430. The controller 440 may communicate with individual inverter modules 415a, 415b, 415c, 415n in order to coordinate the outputs of each string member 412 to achieve the desired power and overall energy based on the performance or operation of each string member 412. For example, the controller 440 may provide individual control signals to each of the individual inverter modules 415a, 415b, 415c, 415n to dynamically control the conversion at each string member 412. In some examples, the controller 440 may provide each inverter module 415a, 415b, 415c, 415n with a synchronization signal, as described herein. Also, in some examples, the controller 440 may provide one or more of the inverter modules 415a, 415b, 415c, 415n with a phase offset multiplier and/or phase offset for its respective switch control signal, as described herein. In some examples, the inverter system 400 may comprise individual string controllers (e.g., multiple controllers 440 resident inside or outside of the string, so that each string 410 has a corresponding controller 440). The individual string controllers may be connected to one another in parallel, and/or in series. In other embodiments, the controller 440 may be provided for multiple strings 410 based on the available controller 440 bandwidth for computation and communication. In examples with multiple string controllers, each string controller may or may not communicate directly with one another. In such cases, the plurality of string controllers may also communicate with a master controller 440.

Based on the control signals provided by the controller 440, each of the one or more strings 410 can be caused to generate a certain AC output having a certain phase to the load center 430. The output from a string 410 (e.g., from the combined output of individual string members 112) can be provided to a respective grid connection filter 450, which can then be connected to a respective grid disconnect/protect 460. In some examples, multiple strings 110 can be coupled to a single grid connection filter 450 and/or a single grid disconnect/protect 460. The grid connection filter 450 can be coupled to the string 410 to provide an interface for providing the output from the string 410 (e.g., sum of the voltage and/or current) to an existing electrical grid 470 (e.g., the sum of the current that is outputted from individual string members 412 can pass through the grid connection filter 450). In some examples, the load center 430 can provide an interface for providing the output from the strings 410 to one of a stand-alone power system, AC motor drives, and/or AC resistive loads (e.g., instead of coupling the strings 410 to the grid 470).

In some embodiments, the grid connection filter 450 may be coupled to the grid disconnect/protect 460. The grid disconnect/protect 460 can provide protection for the inverter system 400 during instances of grid fault and/or low or high PV conditions. During these faulty conditions, the controller 440 may cause a break in the circuit via the grid disconnect/protect 460 for protecting the system 400. (For example, the grid disconnect/protect 460 may operate similarly to breaker 320 described herein. In some examples, disconnect/protection control mechanism can be independent of the string controller(s) 440 and may be resident inside the grid disconnect/protects 460. For example, the load center 430 can be at least a part of a termination box or circuit breaker of a residence or commercial building. The grid disconnect/protects 460 can include one or more grid disconnect switches (and one or more inductors) that can be controlled by the controller 440 or separately by its own disconnect/protect controller inside the grid disconnect/protects 460 during a grid fault and/or low or high PV conditions. By controlling the outputs of individual string members 412 in a string 410, e.g., by introducing a phase offset into the respective switch control signals, as described herein, the inverter system 400 may improve and enhance the performance of collecting and converting energy for a variety of different uses.

Figure 16:
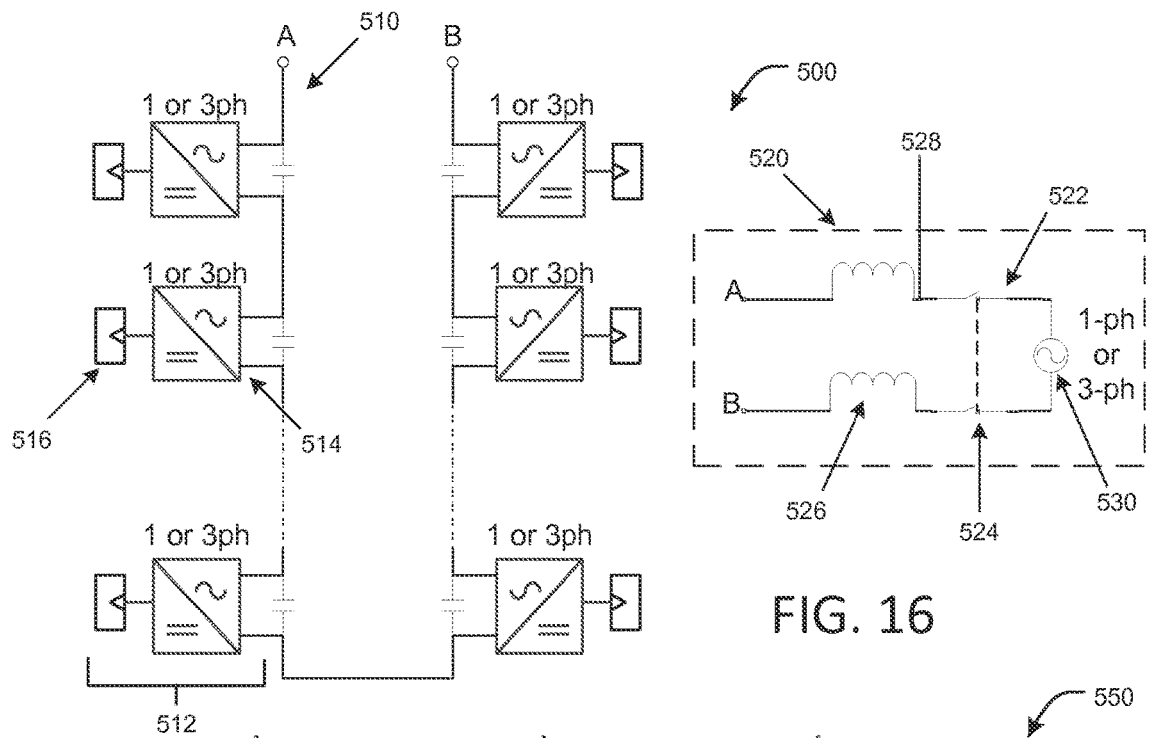
FIGS. 16-17 illustrate additional examples of inverter systems that may be operated with phase-offset switch control signals.
Figure 17:
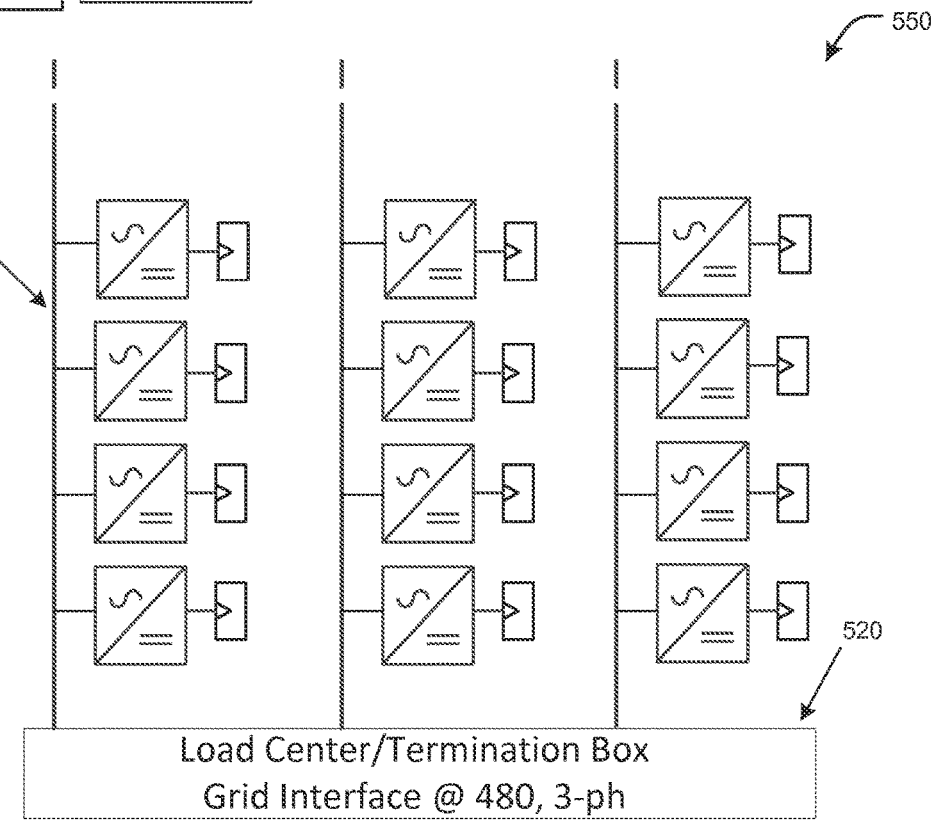

FIGS. 16-17 illustrate additional examples of inverter systems that may be operated with phase-offset switch control signals, as described herein. The systems such as described with respect to FIGS. 16-17 may be implemented, for example, with components described with respect to FIGS. 1-15. FIG. 16 shows an inverter system 500 that comprises a string 510 coupled to a central load center or termination box 520. Additional strings 510 may be coupled to the load center or termination box 520, but are not illustrated in FIG. 16 for simplicity (e.g., the load center 520 may be coupled to one, two, three, four, twenty, thirty, fifty or more, etc., strings 510). The strings 510 can be coupled to the load center 520 in parallel, in series, or in any combination thereof.

Each string 510 includes one or more inverter modules 512 that are coupled to each other in series. In some examples, each inverter module 512 includes an inverter module 514 that is coupled to a DC source 516, (e.g., a photovoltaic panel). The DC source 516 may provide a DC output to the inverter module 514, so that each inverter module 512 can provide an AC output to the string 510. Each inverter module 512 may output a low-voltage, which can include any of the voltage values as described in this application. The inverter modules 512 making up any given string 510 may utilize phase-offset switch control signals, as described herein, to increase the effective switching frequencies of the inverter modules 512.

The inverter modules 514 shown in FIGS. 16 and 17, for example, may be configured for a single phase power system or for multiple-phase power systems, such as a three-phase power system. For implementing three phase converter system examples, the configuration of the string 510 and the string members 412 may include additional components, such as more switches and/or magnetic components, and can utilize a particular wiring arrangement. For simplicity purposes, a single-phase implementation is discussed in the application.

In some embodiments, a single load center 520 can be provided for the inverter system 500. Alternatively, a plurality of load centers 520 may be provided. In examples with a plurality of load centers 520, the load centers 520 may be connected to each other in parallel, in series, or in combination thereof. The load center 520 may include one or more circuit breakers 522, one or more grid disconnect switches 524, and one or more magnetic components 526 (e.g., one or more inductors). In some instances, the load center 520 can include or be part of a switchgear, and one, two, or more inductors along the switchgear can be used as passive power components. The load center 520 can also include a controller (or alternatively, multiple controllers, such as one controller per string 410) that can provide commands for controlling the combined AC output of the string 510 and/or the individual AC outputs of the individual inverter modules 512. In some examples, the controller can provide, for example, control signals 528 for controlling the power factor (PF) of the inverter system 500 and/or for controlling the maximum power point tracking (MPPT) of the inverter system 500. During instances of grid fault and/or low or high PV conditions, the controller may be programmed to cause a break between the inverter system 500 and the electrical grid 530 or other load utilizing one or more disconnect switches 524.

The load center 520 can also interface the inverter system 500 to an existing electrical grid 530 or other suitable load. In various examples, the electrical grid 530 can be configured for a single phase power system or for a three-phase power system. By controlling the string 510 and the individual inverter modules 512, the load center 520 can enable the system 300 to have grid compatibility and connectivity. In some examples, the load center 520 may also provide inverter modules 514 of the string members 510 with a synchronization signal that may be utilized to implement phase offsets between switch control signals of the inverter modules 514. Also, in some examples, the load center 520 may provide one or more of the inverter modules 514 with a phase offset multiplier and/or phase offset for its respective switch control signal, as described herein.

FIG. 17 shows one example of an inverter system 550 that includes three or more strings 510 that are coupled to a central load center or termination box 520. In the example shown in FIG. 17, the load center 520 includes a grid interface for interfacing the inverter system 550 to an existing 480 V, three-phase electrical grid (not shown in FIG. 17). Depending on various implementations, the load center 520 can include individual string controllers for each of the three strings 510 and/or include a consolidated string controller for multiple strings based on available controller bandwidth for computation and communication. For simplicity purposes, the three strings 510 illustrated are representative of the three single-phase strings to constitute a three-phase power system, but some examples could include additional strings and/or configurations for implementing a three-phase system 550. In some examples, the system 550 can include a plurality of load centers 520. In these examples, the plurality of load centers 520 can be connected to each other in parallel, in series, or in combination thereof. Additional examples of inverter systems that may be operated with phase-offset switch control signals, as described herein, are found in U.S. Patent Application Publication No. 2013/0181527 entitled "Systems and Methods for Solar Photovoltaic Energy Collection and Conversion," which is incorporated herein by reference in its entirety.

Although various systems described herein may be embodied in software or code executed by one or more microprocessors as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The methods described herein show the functionality and operation of various implementations. If embodied in software, each action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the actions described herein may describe a specific order of execution, it is understood that the order of execution may differ from that which is described. For example, the order of execution of two or more actions may be scrambled relative to the order described. Also, two or more actions may be executed concurrently or with partial concurrence. Further, in some embodiments, one or more of the actions may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A direct current (DC) to alternating current (AC) inverter system, comprising:
    a first inverter module configured to receive a first DC input from a first DC source and provide a first AC output to an electrical grid, the first inverter module comprising:
        a first switch electrically coupled between the first DC input and the first AC output;
        a first filter coupled between the first DC input and the first AC output; and
        a first control circuit configured to:
            receive a synchronization signal indicating a zero crossing of a signal on the electric grid;
            generate a first interleaved switch control signal relative to the synchronization signal, wherein the first interleaved switch control signal is independently generated by the first control circuit within the first inverter module to independently interleave the first AC output, and wherein the first interleaved switch control signal is interleaved from the synchronization signal by a first interleave angle;
            modulate the first switch according to the first switch control signal;
    a second inverter module configured to receive a second DC input from a second DC source and provide a second AC output to the electrical grid, wherein the first inverter module and the second inverter module are electrically coupled in series such that an AC output of the inverter system comprises a sum of the first AC output and the second AC output, the second inverter module comprising:
        a second switch electrically coupled between the second DC input and the second AC output;
        a second filter electrically coupled between the second DC input and the second AC output; and
        a second control circuit configured to:
            receive the synchronization signal; and
            generate a second interleaved switch control signal relative to the synchronization signal, wherein the second interleaved switch control signal is independently generated by the second control circuit within the second inverter module to independently interleave the second AC output, wherein the second interleaved switch control is interleaved from the synchronization signal by a second interleave angle, and
            wherein a system output of the DC to AC inverter system is a sum of the first AC output and the second AC output.

2. The inverter system of claim 1, wherein the inverter system comprises a plurality of inverter modules including the first inverter module and the second inverter module, wherein the plurality of inverter modules consists of a first number of inverter modules, wherein the first interleave angle is equal to $2\pi$ divided by the first number.

3. The inverter system of claim 1, wherein the inverter system comprises a plurality of inverter modules including the first inverter module and the second inverter module, wherein the plurality of inverter modules consists of a first number of inverter modules, wherein the first interleave angle is equal to $\pi$ divided by the first number.

4. The inverter system of claim 3, wherein an effective switching frequency of the inverter system is the first number multiplied by an actual switching frequency of the first inverter module and the second inverter module.

5. The inverter system of claim 1, wherein the inverter system comprises a plurality of inverter modules including the first inverter module and the second inverter module, wherein the plurality of inverter modules consists of a first number of inverter modules, and wherein the second control circuit is further configured to:
receive a multiplier; and
determine the first interleave angle by multiplying the multiplier by an interleave angle unit.

6. The inverter system of claim 5, wherein the second control circuit is further configured to receive the multiplier from a system controller of the inverter system.

7. The inverter system of claim 1, wherein the first control circuit is configured to randomly select the first interleave angle and the second control circuit is configured to randomly select the second interleave angle.

8. An electrical converter, comprising:
a first converter module configured to receive a first direct current (DC) input and provide a first output, comprising:
a first switch; and
a first module control circuit configured to:
generate a first interleaved switch control signal, wherein the first interleaved switch control signal is independently generated by the first module control circuit within the first converter module to independently interleave the first output by a first interleave angle; and
modulate the first switch according to the first switch control signal; and
a second converter module configured to receive a second DC input and provide a second output, comprising:
a second switch; and
a second module control circuit configured to:
generate a second interleaved switch control signal, wherein the second interleaved switch control signal is independently generated by the second module control circuit within the second converter module to independently interleave the second AC output by a second interleave angle; and
modulate the second switch according to the second switch control signal.

9. The electrical converter of claim 8, further comprising a converter controller circuit configured to:
generate a synchronization signal; and
send the synchronization signal to the first module control circuit; and
send the synchronization signal to the second module control circuit.

10. The electrical converter of claim 9, wherein converter controller circuit is further configured to send the synchronization signal to the first module control circuit and send the synchronization signal to the second module control circuit by at least one of:
encoding the synchronization signal onto a power grid;
writing the synchronization signal to a communications bus; or
wirelessly transmitting the synchronization signal.

11. The electrical converter of claim 8, wherein the electrical converter comprises a plurality of converter modules including the first converter module and the second converter module, wherein the plurality of converter modules consists of a first number of converter modules, and wherein the first interleave angle is equal to $2\pi$ divided by the first number.

12. The electrical converter of claim 8, wherein the electrical converter comprises a plurality of converter modules including the first converter module and the second converter module, wherein the plurality of converter modules consists of a first number of converter modules, and wherein the first interleave angle is equal to $\pi$ divided by the first number.

13. The electrical converter of claim 8, wherein the electrical converter comprises a plurality of converter modules including the first converter module and the second converter module, wherein the plurality of converter modules consists of a first number of converter modules, and wherein the second module control circuit is further configured to:
receive a multiplier for the second converter module;
receive a interleave angle unit; and
determine the second interleave angle by multiplying the interleave angle unit by the multiplier for the second converter module.

14. The electrical converter of claim 13, wherein an effective switching frequency of the electrical converter is equal to the first number multiplied by an actual switching frequency of the first converter module and the second converter module.

15. The electrical converter of claim 13, wherein the second module control circuit is further configured to randomly select the multiplier for the second converter module.

16. The electrical converter of claim 13, wherein the second module control circuit is further configured to receive the multiplier from a system controller of the electrical converter.

17. The electrical converter of claim 8, wherein the first module control circuit is configured to randomly select the first interleave angle.

18. The electrical converter of claim 8, further comprising:
a third converter module configured to receive a third DC input and provide a third output, wherein the first converter module, the second converter module, and the third converter module are connected in series to provide the converter output, wherein the third converter module comprises:
a third switch; and
a third module control circuit configured to:
generate a third interleaved switch control signal, wherein the third interleaved switch control signal is independently generated by the third module control circuit within the third converter module to independently interleave the first output by a third interleave angle; and
modulate the third switch according to the third switch control signal.

19. The electrical converter of claim 8, wherein the converter output comprises a sum of the first output and the second output.

20. The electrical converter of claim 8, wherein the converter output is a DC output.

* * * * *